United States Patent [19]

Stauffer

[11] 4,021,119

[45] May 3, 1977

[54] POSITION GAUGE

[75] Inventor: Norman L. Stauffer, Englewood, Colo.

[73] Assignee: Honeywell Inc., Minneapolis, Minn.

[22] Filed: June 24, 1975

[21] Appl. No.: 589,939

[52] U.S. Cl. .............................. 356/159; 250/239; 250/578; 356/199

[51] Int. Cl.² ..................................... G01B 11/10

[58] Field of Search .......... 356/156, 160, 167, 199, 356/200, 256, 159; 250/239, 571, 578

[56] References Cited

UNITED STATES PATENTS

| 3,258,686 | 6/1966 | Selgin ................................ 356/156 |
| 3,730,633 | 5/1973 | Kennedy ............................ 356/167 |
| 3,749,500 | 7/1973 | Carlson et al. .................... 356/160 |
| 3,900,738 | 8/1975 | McKay, Sr. ........................ 356/156 |

OTHER PUBLICATIONS

Leonard, M. "Digital Noncontact Gages for the Metals Industry", Proc. 19th Intern. ISA Iron and Steel Instrumentation Symp., Pittsburgh, Pa. USA, 17-19, Mar. 1969, pp. 15-25.

*Primary Examiner*—John K. Corbin
*Assistant Examiner*—W. H. Punter
*Attorney, Agent, or Firm*—Laurence J. Marhoefer; Lockwood D. Burton

[57] ABSTRACT

An optical gauging apparatus includes structure defining a pair of light beams. One of the beams comprises a reference beam while the other is a measuring beam. An object to be gauged is positioned to partially interrupt the measuring beam. The partially interrupted measuring beam is compared with the reference beam as the object to be gauged is run through the gauging process.

4 Claims, 5 Drawing Figures

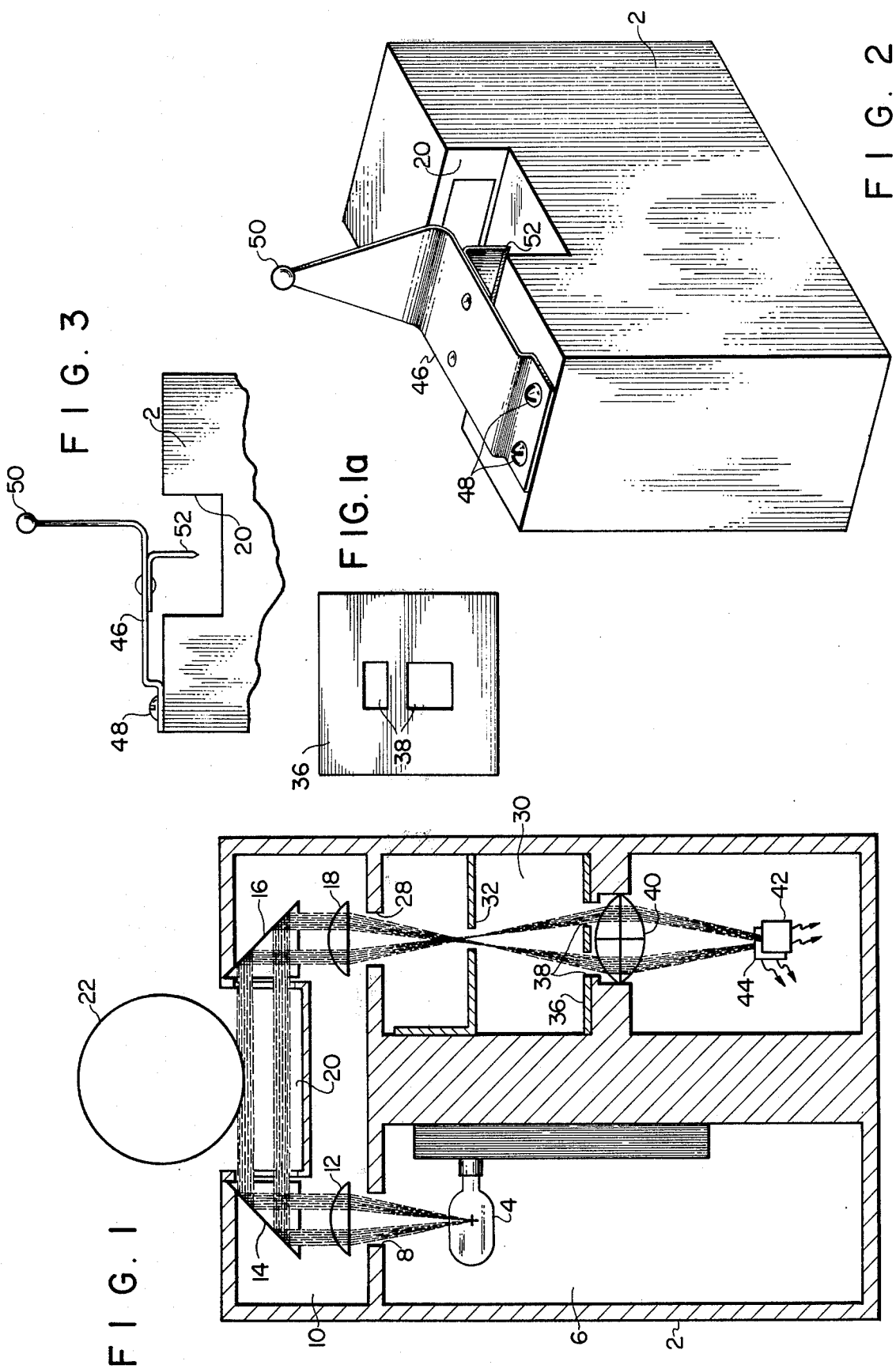

POSITION GAUGE

BACKGROUND OF THE INVENTION

1. Field of the Invention

The present invention relates to gauging means, and more particularly to apparatus for determining the relative position or change of position of an object under test.

2. Description of the Prior Art

Heretofore, there have been provided various types of devices for effecting a gauging of the numerous aspects of measuring and testing the mechanical properties of an object under test. These have been in the form of mechanical feeler guages, with accompanying mechanical metering, for checking run-out, or eccentricity of a rotatable member. Such feeler gauges have also been employed to determine dimensional features. Mechanical feelers of that type have the disadvantage of relative inaccuracies resulting from relatively low frequency response when used to determine run-out on a rotating member. For use with a static body, the mechanical metering means have an inherently limited accuracy and sensitivity from the mechanical nature of the system. Further, there are numerous instances wherein it is not desirable to physically touch the object under test. A contacting gauge under such conditions would be harmful to the object.

Alternatively, there have been provided, heretofore, optical sensors as gauges for dimensional determinations. Such optical gauges are exemplified by several patents issued to Samuel C. Hurley, Jr., namely, U.S. Pats. Nos. 2,415,174; 2,415,175; 2,415,176; 2,415,177; 2,415,178; 2,415,179. These patents relate to a means for determining whether or not an object under test matches prescribed dimensions within established tolerances. Because they rely on the illumination or obfuscation of one or more pairs of spaced photodetectors, the relative sensitivity and/or accuracy of such optical systems are necessarily limited.

In another optical sensing device, a single light source and a single photodetector are used to detect deformation of a human eyeball as a means of detecting glaucoma. That device is shown in U.S. Pat. No. 3,304,769 issued to the present inventor. For precise measurements, the power supply for the light source as well as the associated electronic circuitry must be highly regulated in order to avoid errors due to electrical variations.

SUMMARY OF THE INVENTION

It is an object of the present invention to provide an improved gauging means which obviates the shortcomings of the prior art devices.

It is another object of the present invention to provide an improved gauging means, as set forth, which provide very high accuracy and sensitivity.

It is a further object of the present invention to provide an improved gauging means as set forth and which features a non-contacting measurement.

It is yet another object of the present invention to provide an improved gauging means as set forth which includes self-compensating stability.

In accomplishing these and other objects, there has been provided, in accordance with the present invention, an optical gauging means which includes a single radiation source, and means for deriving a pair of beams from that single source. One of the beams constitutes a reference beam; the other is a measuring beam. The two beams are so directed that one may be partially interrupted by an object to be gauged. The beams are thereafter directed to impinge on a pair of photodetectors, the outputs of which are compared to produce a difference signal representative of the gauging of the object.

BRIEF DESCRIPTION OF THE DRAWINGS

A better understanding of the present invention may be had from the following detailed description when read in connection with the accompanying drawings in which:

FIG. 1 is a cross-sectional view of a schematic representation of a structure embodying the present invention;

FIG. 1a is a plain view of an alternate arrangement of a portion of the structure shown in FIG. 1;

FIGS. 2 and 3 are views of a contact feeler for use with the structure shown in FIG. 1.

DETAILED DESCRIPTION

Figure 4:
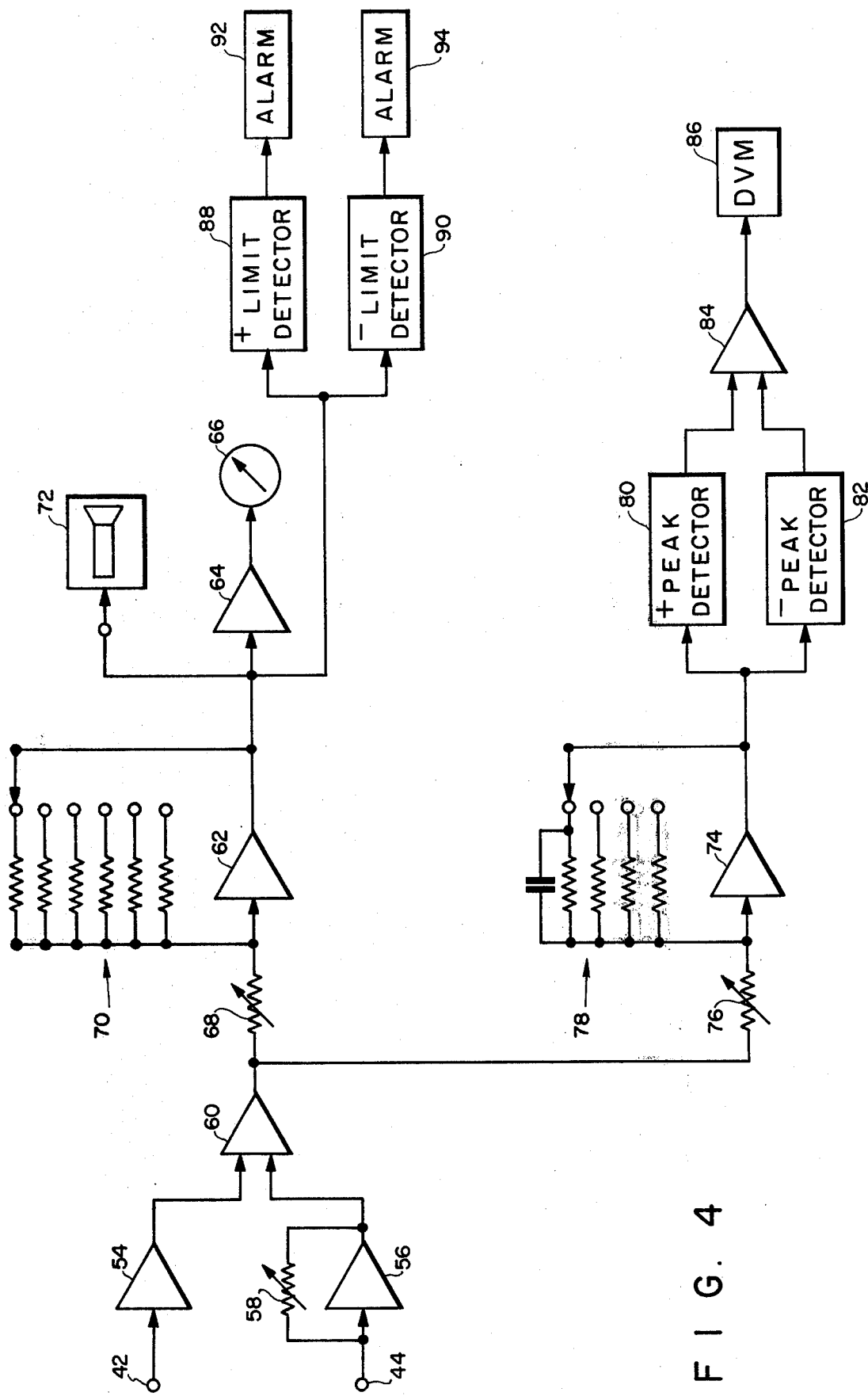
FIG. 4 is a schematic diagram of a circuit suitable for use in carrying out the present invention.

Referring, now, to FIG. 1 in more detail, there is shown a housing member 2. A source of radiation represented by a lamp 4 is mounted in a first compartment 6 in the housing 2. An opening 8 through one of the walls defining the first compartment 6 allows radiation from the source member 4 to pass into a second compartment 8 of the housing 2.

In the second compartment 10, there is positioned a first condensing lens 12, a first prism 14, a second prism 16 and a second condensing lens 18. The positional relationship of the first condensing lens and the lamp 4 is such that the radiation source is effectively at the focus of the lens 12 whereby the radiation from the source 4 is formed into parallel rays. The first prism 14 is positioned to change the direction of those parallel rays by 90°. A transverse channel 20 is formed across the second compartment 10 to accomodate an object 22 to be gauged. Each of the facing walls of the channel 20 has a window 24, 26, respectively, therein. The parallel rays are directed by the first prism 14 through the first window 24 toward the second window 26. The second prism 16 is positioned behind the second window 26 to receive the parallel rays and again change their direction by 90°.

The redirected rays from the second prism 16 are passed through the second condensing lens 18 whereby the radiation is reformed into a converging bundle of rays. The converging bundle of rays is directed through an opening 28 into a third compartment 30. A first aperture plate 32 has an opening or pupil 54 therein. The first aperture plate is located within the third compartment at a position which coincides with the image of the radiation source 4 formed by the lenses 12 and 18. A second aperture plate 36 has a pair of openings or pupils 38. The second aperture plate 36 is mounted within the third compartment 30 at a position which coincides with the image plane of an object 22 placed in the channel 20.

A split condensing lens 40 is mounted behind and adjacent the second aperture plate 36. The radiation passing through the two pupils 38 of the plate 36 is focused separately, due to a slight displacement of the two halves of the split lens 40, on two electrically responsive photosensitive radiation detectors 42 and 44, respectively.

In operation, the radiation source 4 is energized from a reasonably regulated power supply (not shown). The radiation is illustrated as comprised of two beams. The two beams are effectively established by the two pupils or apertures 38 of the second aperture plate 36. Since both beams are derived from the same source 4, one of the beams may be used as a reference beam while the other beam constitutes the measuring beam.

The location of the first aperture plate 32 at the plane of the image of the radiation source 4 restricts the light impinging on the detectors 42 and 44 to only the light coming from that source. Ambient light, even light which is reflected at grazing incidence off surfaces of the object 22, is eliminated.

In a preferred embodiment, the cross-sectional area of the reference beam is substantially one-half the crosssectional area of the measuring beam, as shown in FIG. 1a. Thus, an initial or reference position of the object relative to the gauging means is established when the two beams are effectively balanced.

The two beams are, as has been set forth, arranged to impinge on the separate photodetectors 42 and 44. Through electronic means, to be hereinafter shown, the output signals for the two photodetectors may be balanced to constitute the reference condition. If the object being gauged is to be gauged for eccentricity or run-out, the reference condition may be established with the object in a stationary position partly intercepting the measuring beam. Then when the object is rotated, the change in the status of balance between the two beams is a function of the eccentricity or run-out of the object under test. Since the two beams are derived from the same source, minor variations in the energization of that source does not introduce disturbing inaccuracies in the resulting measurement; the same variations occur in both beams and the measurement is a function of the differential between them.

In an apparatus constructed in accordance with the present invention, with beam thickness of 0.020 inch, a resolution of one microinch was obtained with a response time of less than one millisecond.

It will be appreciated that, in addition to the measurment of run-out, the apparatus may also be used to gauge stationary objects as well. Further, the device may be used as a very precise thickness gauge for web material passing over a predetermined reference surface.

While the gauging means of the present invention is uniquely adapted to providing a highly sensitive, accurate, stable and reliable measurement relative to an object, without physically touching that object, there are instances wherein there is a need for gauging an object on a physical contact basis. For example, it may be desired to gauge the surface of a flat sheet member, or an object which is too large to fit within the channel 20 of the structure shown in FIG. 1. The gauge of the present invention may still be used to provide a highly accurate, stable contact gauging. The structure shown in FIGS. 2 and 3 includes an attachment for converting the optical gauge to a contact gauge. To that end, there is shown the gauge housing 2 with the elements therein as shown in FIG. 1. To the top of the housing 2 there is secured a contact feeler 46. The feeler 46 is made of a suitable spring material secured at one end, as by a pair of screws 48, to the edge of the housing 2. The other end of the feeler 46 is cantilevered over the channel 20, then bent at substantially a right angle away from the channel 20 and terminating in a contact point 50. The contact point 50 may be in the form of a ball. A vane 52 is attached to the feeler member 46 and is positioned to extend into the channel 20. The structure is so arranged that in an unloaded or normal condition, the quiescent position of the spring cantilever holds the vane 52 just out of the path of the measuring beam of the optical measuring system. When the apparatus is put into operation, the ball contact point 50 is placed in engagement with the surface to be gauged. The structure is then positionally adjusted until the vane 20 interrupts one-half of the measuring beam and the resultant signals from the two photodetectors balance. When the object or surface being gauged is then moved relative to the contact point 50, any change in dimension will be reflected by an unbalance of the resulting electrical signals, with substantially the same degree of sensitivity, accuracy and stability as the non-contacting mode.

An electronic circuit suitable for use in connection with the present invention is schematically shown in FIG. 4. The photodetector 42 responsive to the measuring beam is coupled to the input of an amplifier 54 while the reference photodetector 44 is coupled to the input of a similar amplifier 56. A variable feedback resistor 58 connected across the amplifier 56 permits the output of that amplifier to be adjusted to effect an initial "zero" condition for the measuring system. The output signals from the amplifiers 54 and 56 are applied, respectively, to the input terminals of a differential amplifier 60.

The output of the differential amplifier 60 is applied, first, to the input of a first range control amplifier 62, the output of which is applied to the input of a meter driver amplifier 64. A suitable meter 66, preferably a center-zero meter, is connected to respond to the output of the amplifier 64. Between the output of the differential amplifier 60 and the input of the first range control amplifier there is connected a variable resistor 68 which provides a calibration control for the meter 66. A bank of resistors 70 is arranged for selective connection in feedback relation with respect to the first range control amplifier whereby to effect changes in the sensitivity range of the measurement indicated on the meter 66.

The output of the range control amplifier 62 is also arranged for application to other utilization apparatus 72 which may, for example, be an oscilloscope, an oscillograph or a signal analyzer.

The output of the differential amplifier 60 is also applied to the input of a second range control amplifier 74 through a second calibration resistor 76. Again, an impedance bank 78 is arranged for selective connection in feedback relation with respect to the second range control amplifier whereby to effect changes in the operating range of the instrument controlled thereby. The output of the second range control amplifier is applied to the input of a pair of peak detectors 80 and 82, one of which detects and holds a positive peak while the other detects and holds a negative peak. The output of these two peak detectors is applied, respectively, to the input terminal of a differential amplifier 84. The output of the differential amplifier 84 is applied to the input of a digital voltmeter 86. The indication displayed by the digital voltmeter 86 will, therefore, be representative of the total (peak to peak) run-out, eccentricity or deviation of the dimensions of the object being gauged.

In order to determine that the range selection effected by selection of the individual feedback resistors from the bank 70 is an appropriate range, there is provided a signal limit alarm means. That limit alarm means comprises a positive signal limit detector 88 and a negative signal limit detector 90. An alarm device 92, which may be in the form of a light emitting diode, is connected to respond to an output signal from the positive signal limit detector 88. A similar alarm device 94 is connected to respond to an output signal from the negative limit detector 90. If a relatively small range selection has been effected by the range control amplifier, a short but large signal peak would not be properly indicated on the meter 66. Such a peak would cause one or the other (or both of the alarms 92 and 94) to be actuated, alerting the operator to change the range.

Thus, there has been provided, in accordance with the present invention, an improved gauging means for effecting a highly accurate and sensitive measurement of dimensional characteristics of an object to be gauged, which features the effecting of the measurement without the necessity of physically touching the object and which features a selfcompensating stability.

The embodiments of the invention in which an exclusive property or privilege is claimed are defined as follows:

1. An optical gauging means comprising a housing member,
   means defining a plurality of compartments within said housing member,
   a light source means mounted in a first one of said compartments,
   means within said housing member for defining a first and a second effective beam of light from said light source means,
   means for directing said first and second effective beams of light from said first compartment through a second one of said compartments and into a third one of said compartments,
   a first and a second electrically responsive photodetector mounted within said third compartment, said first photodetector being position to be responsive to said first beam of light and said second photodetector being positioned to be responsive to said second beam of light,
   means defining a channel across said second compartment and transverse said first and second light beams, said channel being adapted to receive an object to be gauged therein a position to partiallly interrupt said first light beam, said second light beam comprising a reference beam,
   means differentially responsive to output signals from said first and second photodetectors as a measure of the gauging of said object,
   said means for defining said first and second light beams including a lens system for producing light in substantially parallel rays across said channel,
   said lens system forming an image of said light source means within said third compartment and being characterized by the inclusion of an aperture plate within said third compartment at the position of said image of said light source means whereby to effectively exclude extraneous light.

2. An optical gauging means as set forth in claim 1 wherein said lens system forms an image of a plane transverse of said channel, which plane represents the position to be occupied by an object to be gauged, said last-mentioned image being formed at a position intermediate said aperture plate and said photodetectors, and characterized by the inclusion of a further aperture plate at the position of said last-mentioned image, said further aperture plate having a first and a second aperture therein corresponding to and effectively defining said first and second light beam respectively.

3. An optical gauging means as set forth in claim 2 wheein said lens system includes a split lens positioned adjacent to said further aperture plate, one-half of said split lens being positioned to focus the light passing through one of the apertures of said further aperture plate onto one of said photodetectors, the other half of said split lens being positioned to focus the light passing through the other aperture of said further aperture plate onto the other of said photodetectors.

4. An optical gauging means as set forth in claim 2 wherein said first aperture in said further aperture plate is substantially twice the size of said second aperture in said further aperture plate whereby to define said first, or measuring, beam as having a cross-section area substantially twice that of said second, or reference beam.

* * * * *